May 5, 1931.  F. SPENO  1,804,286
CONVEYER
Filed June 7, 1928  3 Sheets-Sheet 1
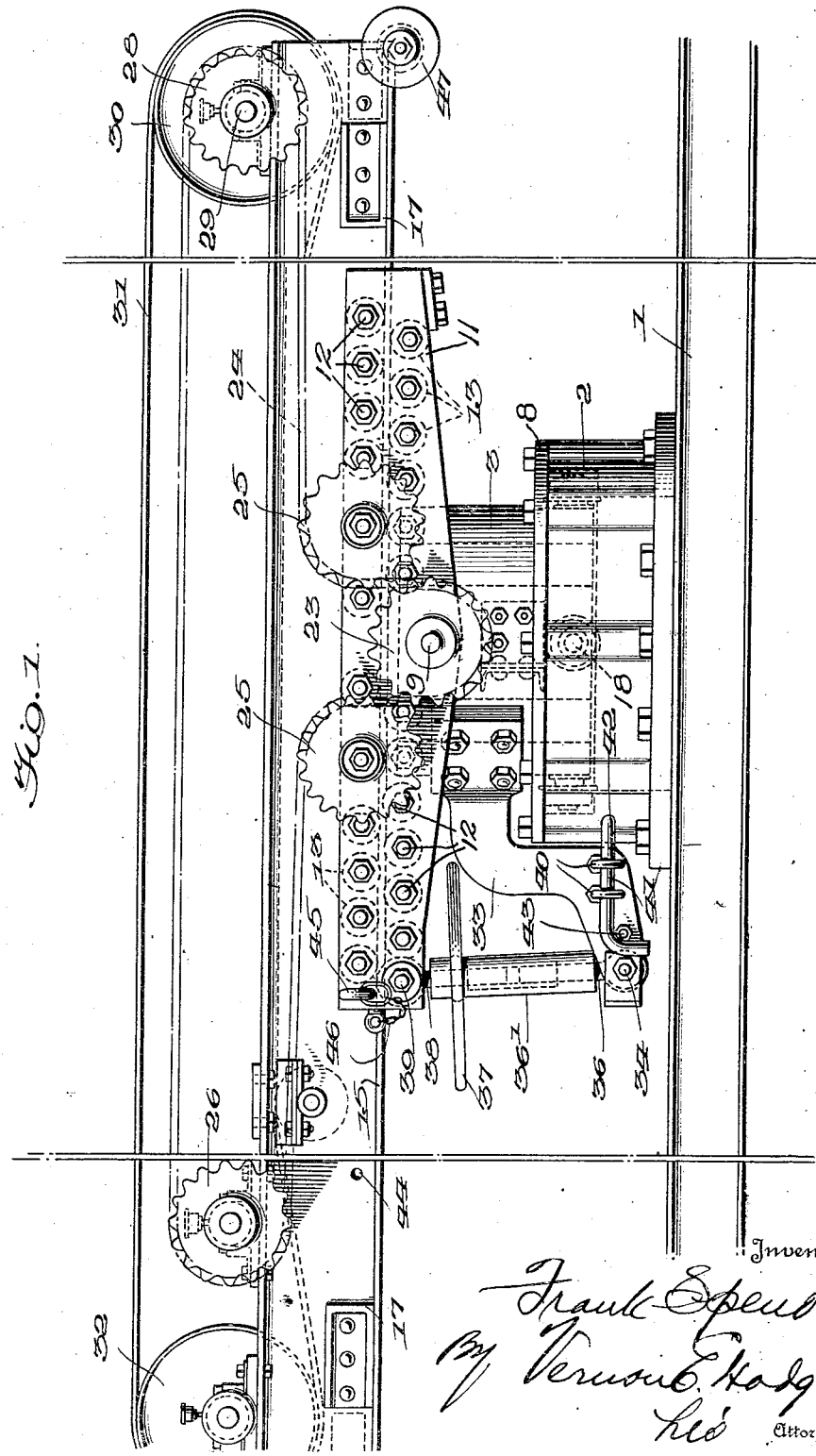

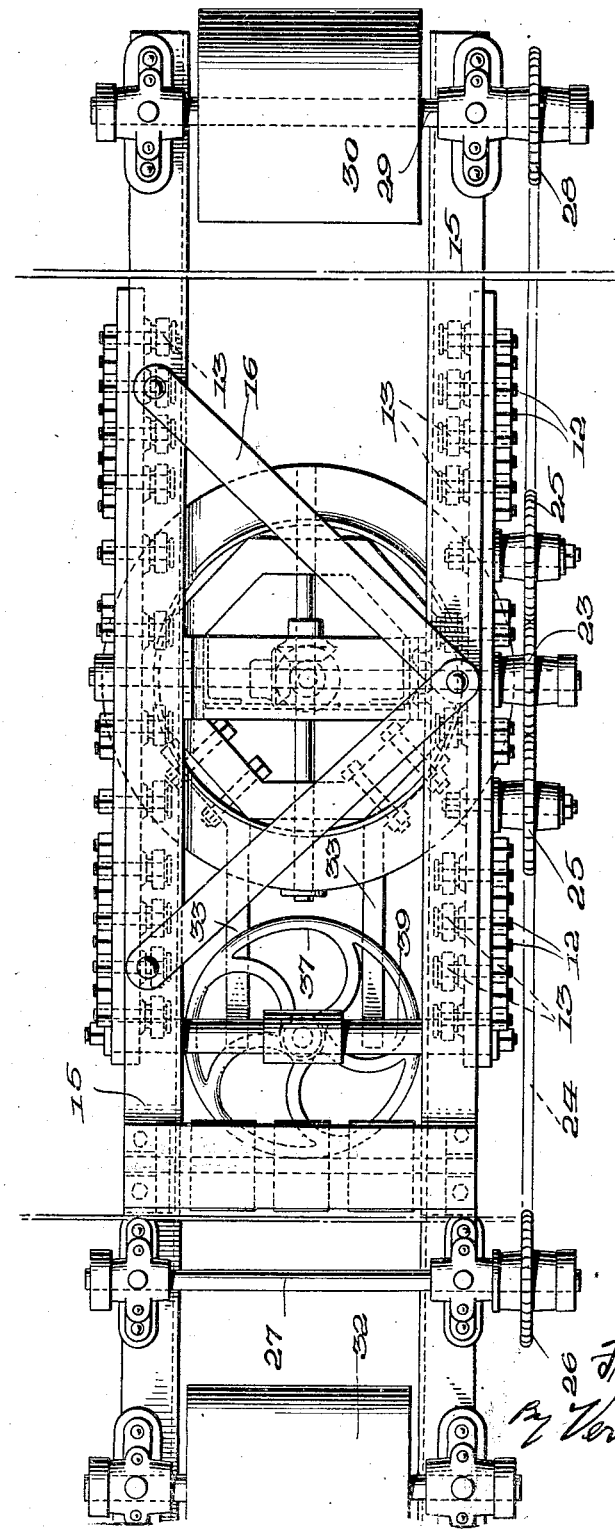

May 5, 1931.　　　　　F. SPENO　　　　　1,804,286
CONVEYER
Filed June 7, 1928　　3 Sheets-Sheet 3

Inventor
Frank Speno
By Vernon E. Hodges
His Attorney

Patented May 5, 1931

1,804,286

UNITED STATES PATENT OFFICE

FRANK SPENO, OF ITHACA, NEW YORK

CONVEYER

Application filed June 7, 1928. Serial No. 283,670.

This invention relates to an improvement in conveyers.

The object of the invention is to provide an endless conveyer preferably of the belt type for transporting or moving material from one location to another. The conveyer is particularly developed for use on a ballast cleaning machine, but it is obvious that it may be used in any other capacity or wherever it may be desired for a similar purpose.

A further object of the invention is to allow a movement of the conveyer about an axis which allows it to swing either to one side or the other, or to be tilted so as to change the relative positions of the conveyer and to allow it to deliver the material to various locations at will by merely changing the supporting structure for the conveyer.

In the accompanying drawings:

Fig. 1 is a side elevation of the conveyer:

Fig. 2 is a top plan view of the same;

Fig. 3 is a vertical sectional view through the turn table for the conveyer.

Figure 4:
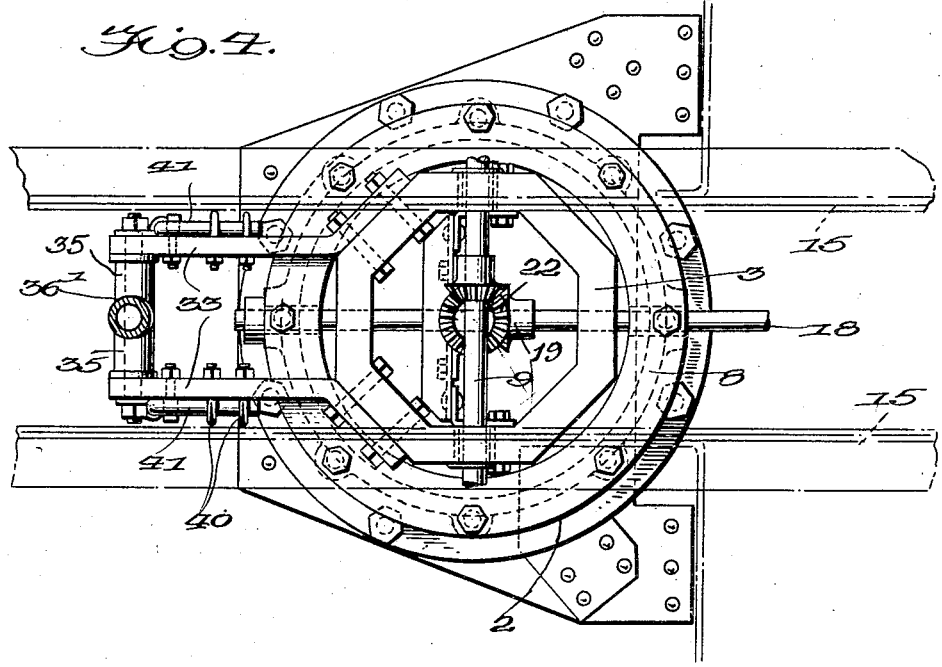
Fig. 4 is a top plan view of the same with the conveyer removed, parts being shown in section.
Figure 5:
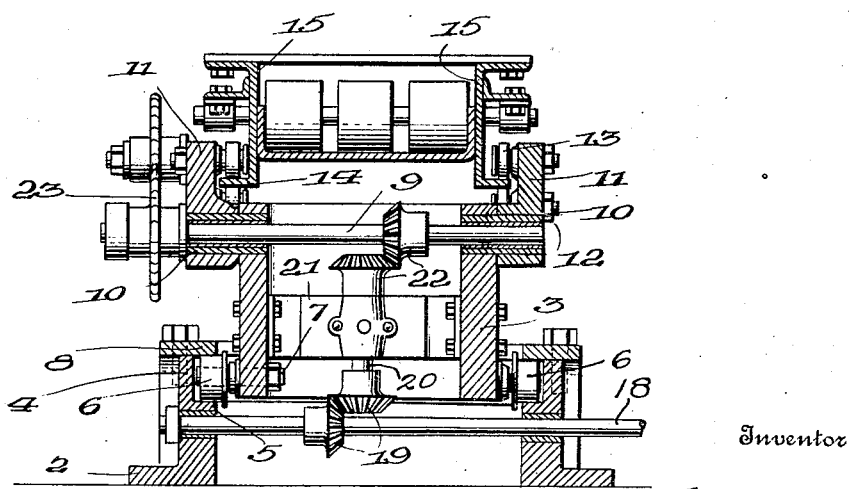

The numeral 1 indicates the floor or support upon which the conveyer is mounted, and to which is bolted or otherwise secured the base 2 for the turn table 3. This turn table 3 is best shown in the sectional view of Fig. 3.

The base 2 is provided with an internal groove 4, having a shoulder 5 on the lower portion thereof, which receives wheels 6 carried on stub shafts, 7 extending radially through the turn table 3. These wheels 6 are interposed between the shoulder 5 and a top plate 8 securely fastened to the base 2, so as to provide a track around the inner surface of the base for guiding the wheels 6 and allowing a turning movement of the cylindrical turn table 3.

A shaft 9 extends transversely across the turn table 3 approximately in the center thereof and through the sleeves 10, which sleeves extend beyond the outer surfaces of the turn table 3, as shown in Fig. 3, and upon outer ends of said sleeves are pivotally mounted the guide plates 11. These guide plates carry bolts 12 shown in Fig. 2, which bolts are arranged along the guide plates 11 in parallel relation but spaced apart so as to form two parallel rows on each of the guide plates. Rollers 13 are mounted upon the inner ends of the bolts 12, which bolts serve as stub shafts for these idle rollers 13. Received between the parallel rows of rollers 13 are the lower flanges 14 of conveyer channels 15, arranged in parallel relation and held properly spaced apart by the diagonally arranged braces 16, as shown in Fig. 2. These conveyer channels 15 are slidably mounted between the rollers 13, which rollers serve to support the channels and form bearings for the longitudinal movement thereof. The sliding movement of the channels is limited in each direction by the stops 17 arranged near the outer ends thereof and adjacent the flanges 14.

A drive shaft 18 is mounted in the base 2 and may be driven from any suitable source of power. This shaft 18 is connected by the bevel pinions 19 with a stub shaft 20 mounted in the transversely arranged bearing plate 21, fixed in the turn table 3. The stub shaft 20 is connected by the bevel gears 22 with the shaft 9, which extends transversely across the turn table 3 and through the sleeves 10, upon which the plates 11 are pivotally supported.

The outer end of the shaft 9 has a sprocket wheel 23 fixed thereon, over which passes a sprocket chain 24. Sprocket wheels 25 are carried by one of the plates 11 on opposite sides of the sprocket wheel 23 and the chain 24 passes over an idle sprocket 26 mounted on a shaft 27 carried by the channels 15, and at the opposite end this chain 24 passes around a sprocket wheel 28 mounted on shaft 29, likewise carried by the inner end of the channels 15. A pulley 30 is fixed on the shaft 29 and forms the driving pulley for an endless belt conveyer 31, which passes over this pulley and likewise over an idle pulley 32 at the opposite end of the channels therefrom.

Carried by the turn table 3 and securely fastened thereto by bolting or otherwise are block arms 33, which extend outwardly and downwardly from the turn table 3 and over the base 2. The outer ends of these arms carry a transversely arranged shaft 34, upon which are mounted the sleeves 35.

Interposed between the inner ends of the sleeves 35 is an eye-bolt 36 extending upwardly from the shaft 34 and screwed into the elongated hub 36' of an elevating wheel 37. A similar eye-bolt 38 is screwed into the upper end of the hub and is connected with a transversely arranged shaft 39 extending across between the ends of the plates 11. The purpose of this wheel 37 and the screws 36 and 38 is to cause a tilting of the conveyer whenever this should be desired.

By rotating the wheel 37, the screws 36 and 38 are moved in opposite directions or at least the upper screw 38 is moved upward, which tilts the outer free end of the conveyer in an upward direction, the conveyer being pivotally mounted on the sleeves 10 carried by the outer ends of the shaft 9, so as to allow this tilting movement.

Slidably mounted in the eye-bolts 40 carried by the arms 33 locking bars 41, which extend into openings in the base 2 for locking the turn table 3 in any desired position relative to this base. Stops 43 limit the inward movement of the bolts 41.

Arranged at intervals in at least one of the channels 15 are holes 44 for receiving a pin 45 carried by a chain 46 attached to the plate 11, which pin passes through the plate 11 and into the hole 44 for locking the channels 15 and likewise the conveyer in a fixed and adjusted position relative to the plates 11 and turn table 3, which regulates the longitudinal movement of the conveyer.

Wheels 47 are carried on the inner end of the channels 15 so that when the conveyer is moved to an extreme inward position, it may be tilted downward, and these wheels roll along on the floor or main support 1 to securely support the inner end of the conveyer.

The operation of the conveyer is simple and, being obvious from the description, need not be described in detail. It is obvious that the conveyer is so constructed as to permit of longitudinal adjustment of the endless conveyer as well as laterally turning movement or a tilting movement, all of which are provided so as to deliver the material to be moved by the conveyer into any of the various positions which may be desired.

I claim:

1. In a conveyer, the combination of a supporting structure, plates pivotally supported thereby about a horizontal axis and in spaced relation, a plurality of guiding rollers carried by said plates, said rollers being arranged in a plurality of rows on each of the plates, and conveying structures having portions thereof slidably received between the rows of rollers on each of the plates.

2. In a conveyer, the combination of a supporting structure, plates pivotally supported thereby about a horizontal axis and in spaced relation, a plurality of guiding rollers projecting outwardly from said plates, said rollers being arranged in a plurality of spaced rows and extending a substantial distance throughout each of said plates, and conveying structure having flanges on opposite sides thereof slidably extending between the rows of rollers on each of the plates.

3. In a conveyer, the combination of a supporting structure, plates pivotally supported thereby about a horizontal axis and in spaced relation, a plurality of guiding rollers carried by said plates, said rollers being arranged in a plurality of rows on each of the plates, conveying structures having portions thereof slidably received between the rows of rollers on each of the plates, means for limiting the sliding movement of the conveying structure, and an idle-roller disposed on the lower side of an extreme end of the conveying structure for supporting said end.

4. In a conveyer, the combination of a base, having an annular shoulder on the inner side thereof, an annular plate secured to the base and cooperating with the shoulder to form a track therearound, a turntable having radially arranged rollers disposed therearound and received within the track, a conveyer carried by the turntable, a main drive shaft extending into the base, a vertical shaft disposed at the axis of the turntable and geared to the drive shaft, and driving means connecting said vertical shaft with the conveyer.

5. In a conveyer, the combination of a base, an upstanding tubular turntable mounted thereon to turn about a vertical axis, a vertical shaft disposed at the axis of the turntable and carried thereby, driving means for said vertical shaft, a horizontal shaft carried by the turntable and geared to the vertical shaft, side plates pivotally supported on the horizontal shaft, conveying mechanism carried by the plates, and driving means connecting the horizontal shaft with the conveying mechanism.

6. In a conveyer, the combination of a turntable, trunnions extending outwardly from opposite sides of the turntable, plates pivotally mounted on the trunnions on opposite sides of the turntable, rollers carried by the inner faces of the plates and arranged in at least two rows longitudinally of each of the plates, and a conveyer frame having outturned flanges received between the rows of rollers for longitudinal adjustment thereof.

7. In a conveyer, the combination of supporting plates spaced apart to receive a conveyer, at least two rows of rollers carried by each plate and extending outwardly therefrom, the rows of rollers on each plate being spaced apart to receive a supporting flange of the conveyer therebetween, and the rollers extending a substantial distance along said flange.

8. In a conveyer, the combination of supporting plates spaced apart to receive a conveyer, at least two rows of rollers carried by each plate and extending outwardly therefrom, the rows of rollers on each plate being spaced apart to receive a supporting flange of the conveyer therebetween, the rollers extending a substantial distance along said flange, the rollers of each pair of rows being staggered relative to each other to securely hold the flange in place.

9. In a conveyer, the combination of a turntable, sleeves extending laterally from opposite sides of the turntable forming trunnions, a conveyer pivotally mounted on the sleeves, a drive shaft for the conveyer and journaled in the sleeves, and driving means for said shaft.

10. In a conveyer, the combination of a turntable, sleeves extending laterally from opposite sides of the turntable forming trunnions, a conveyer pivotally mounted on the sleeves, a drive shaft operatively connected with the conveyer and journaled in the sleeves, and driving means for said drive shaft and extending through the turntable.

In testimony whereof I affix my signature.

FRANK SPENO.